United States Patent [19]

Kronenberg et al.

[11] 3,717,025

[45] Feb. 20, 1973

[54] APPARATUS AND METHOD FOR DETERMINING COEFFICIENT OF FRICTION

[75] Inventors: Francis E. Kronenberg; Alexius B. Olson, both of Peoria; James Poirot, Morton; Gerald D. Rohweder, Peoria; Harold W. Winkler, East Peoria, all of Ill.

[73] Assignee: Caterpillar Tractor Co., Peoria, Ill.

[22] Filed: March 1, 1971

[21] Appl. No.: 122,598

[52] U.S. Cl. .............................. 73/9, 73/10
[51] Int. Cl. .............................. G01n 19/02
[58] Field of Search ........................ 73/9, 10

[56] References Cited

UNITED STATES PATENTS

| | | | |
|---|---|---|---|
| 1,490,603 | 4/1924 | Elverson | 73/9 |
| 3,230,762 | 1/1966 | Doran | 73/9 X |
| 3,552,198 | 1/1971 | Friedland | 73/9 X |
| 3,059,464 | 10/1962 | Deane | 73/9 |
| 3,200,633 | 8/1965 | McCoy | 73/9 |

Primary Examiner—Louis R. Prince
Assistant Examiner—Daniel M. Yasich
Attorney—Fryer, Tjensvold, Feix, Phillips & Lempio

[57] ABSTRACT

An apparatus for obtaining data equatable to the static and dynamic coefficients of friction of the working surface of a friction disc comprises fixture means for mounting and holding the disc for limited pivotal movement about an axes disposed parallel to the central, longitudinal axis of the disc, load application means for urging the working surface of the disc into engagement with a rotating surface to induce pivoting of the fixture and disc, and means for indicating and ascertaining the torque applied to the disc by the rotating surface, including a strain-gaged torque link and associated recording equipment.

12 Claims, 5 Drawing Figures

INVENTORS
FRANCIS E. KRONENBERG
ALEXIUS B. OLSON
JAMES M. POIROT
GERALD D. ROHWEDER
HAROLD W. WINKLER

APPARATUS AND METHOD FOR DETERMINING COEFFICIENT OF FRICTION

BACKGROUND OF THE INVENTION

Commercial acceptance of large friction discs, such as those used in clutches and brakes, dictates the need for an economical and rapid method for accurately determining the static and dynamic coefficients of friction thereof. The automotive industry has developed test machines which are normally limited to the handling of friction discs having a maximum diameter approximating 6 inches. The discs are generally mounted on the driven shaft of a variable speed motor and are subjected to axial loading for test purposes. Large friction discs, such as those used in heavy earthmoving machinery, are normally tested by cutting the friction material of a disc into segments and by mounting the segments onto a smaller disc, thus rendering the tested structure unusable for the intended, commercial applications.

An attempt to utilize the automotive-type testing methods for the testing of large discs would give rise to insurmountable problems. For example, the spinning of a large disc, having an outside diameter of 30 inches, would be highly dangerous to the machine's operator due to large mass involved. In addition, a highly rugged and specially designed machine would be required to withstand the very high loading and horsepower requirements encountered therewith. Such a machine would be unduly complex, expensive to manufacture, and difficult to set-up and operate. Also, the machine would be incapable of testing a sufficient number of test samples per unit time to satisfy accepted quality control standards.

SUMMARY AND OBJECTS OF THE INVENTION

This invention relates to a friction testing apparatus and method for overcoming the above, briefly described problems. The apparatus essentially comprises means for pivotally mounting a test sample thereon and means for rotating a surface against a working surface of the test sample to induce pivoting of the sample. Such pivoting action can be mechanically transposed into a working torque utilized to compute the coefficient of friction of the tested working surface, along with related design parameters. As will be hereinafter more fully understood, the type of groove pattern formed on the tested surface and the diameter of the tested sample or disc have little, if any, effect on the ability to accurately compute the coefficient of friction thereof.

In the preferred embodiment of this invention, the rotated surface which engages the test sample is formed on the free end of a mandrel and load application means are employed to compress the mandrel and working test surface together under a selectively variable, axial load. Torque developed in response to pivoting of the test sample is preferably measured by a strain-gaged torque link and read-out on suitably integrated recording equipment.

In accordance with the above discussions, an object of this invention is to provide a friction testing apparatus and method which satisfy accepted quality assurance programs by economically, expeditiously and accurately obtaining the coefficients of friction of a tested surface, such as the working surface of friction discs employed in axially engaged clutches and brakes, without damaging the test sample.

Another object of this invention is to provide a non-complex apparatus and method of the above type wherein the desired test data is obtained by subjecting the tested surface to a localized rotary force to induce pivoting of the tested sample and a responsive, measurable torque.

DESCRIPTION OF THE PREFERRED EMBODIMENT

Figure 1:
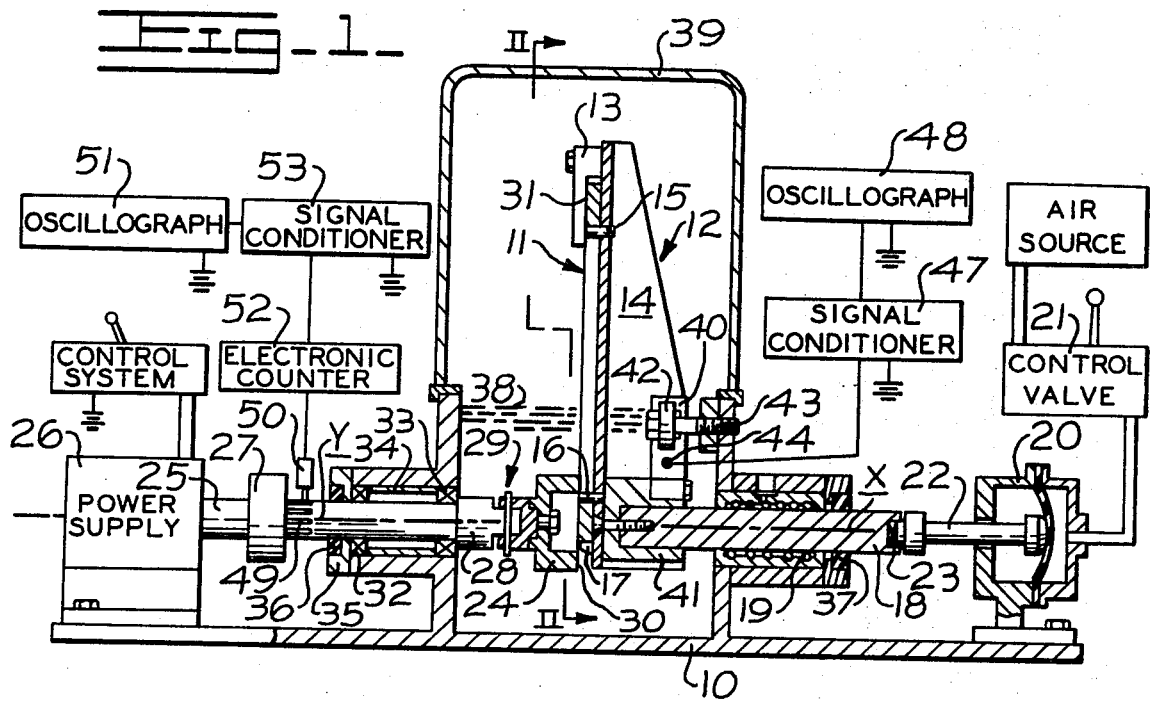
FIG. 1 is a partially schematic, longitudinal section of an apparatus embodying this invention.

The FIG. 1 apparatus comprises a stationary base and integrated support stand 10 adapted to have a test sample, such as an axially engageable friction clutch or brake disc 11, detachably mounted thereon by fixture means 12. The fixture means comprises an interchangeable and vertically adjustable (not shown) clamping means 13 releasably attached to an upstanding member 14. Two pins 15 and 16 and a lower ledge 17, secured to a vertically disposed member 14, cooperate with the clamping means to fixedly mount the disc on member 14.

Figure 3:
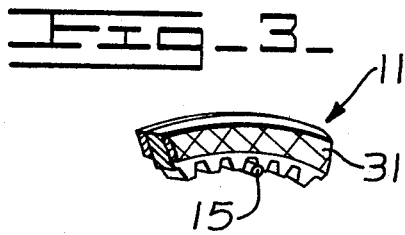
FIG. 3 is a fragmentary view of disc mounted in the FIG. 1 apparatus.

The pins engage internally formed spline teeth of the standard disc (FIG. 3) to prevent it from rotating relative to the fixture means. The pins could be otherwise disposed on member 14 to engage a friction disc having teeth formed externally thereon, for example. The pins are secured to member 14 with upper pin 15 having its free end removably mounted in an aperture formed in clamp 13.

The lower end of the member is secured to a first end of a horizontally disposed shaft 18 rotatably supported in bearing means 19 which further permits the shaft to move axially in the direction of its longitudinal axis X. The shaft is adapted to impose a selectively variable axial loading force on the disc by load application means, shown in the form of a diaphragm-type rotochamber air cylinder 20. A conventional air control valve 21 is arranged to selectively communicate a pressurized air source to the actuating chamber of cylinder 20. Leftward movement of a rod 22 is transmitted to the second end of shaft 18 through a thrust bearing arrangement 23. The thrust bearing permits shaft 18 to rotate and minimizes errors in the hereinafter described measured torque by isolating torsional loads which would otherwise be imparted thereto by the air cylinder.

A rotary means or mandrel 24 is driven by a power output shaft 25 of a manually controlled power supply means 26, such as an electric motor. Shaft 25 is coupled to the mandrel by a self-aligning coupling 27, a spindle 28, and a universal joint 29. The mandrel is preferably in the form of a hollow cylinder, having closely controlled inside and outside diameters, to closely simulate average sliding velocities encountered by the disc in commercial clutch and brake applications.

The last-mentioned drive train elements are normally disposed for rotation about a common longitudinal axis Y, normally coincident with axis X, and accommodate a surface 30 of the mandrel in its assimilation of an actual clutch application. For example, the universal joint assures correct alignment as between surface 30 and a juxtaposed, engageable working surface 31 of the friction disc 11. Mandrel surface 30 is preferably hardened and ground to a fine micro-finish.

Spindle 28 is supported for rotation by spaced bearings 32 and 33, separated by a cylindrical spacer 34. The spacer aids in counteracting axial loads, imposed on mandrel 24 by air cylinder 20, by its engagement with annular bearing 32 which in turn abuts a seal retainer 35 secured to stationary support and housing 10. When oil is used to assimilate commercial clutch lubrication and cooling conditions, the cavities formed in housing 10 provide a sump which is sealed by means of annular seals 36 and 37.

In particular, the apparatus is constructed to permit the disc to "run dry" or with the mandrel and a portion of the disc completely submerged beneath an oil level 38 to assimilate an actual clutch application. The oil may be pumped across the surface of disc 11, if so desired, and the oil temperature in the sump can be controlled by a suitably integrated heat exchanger (not shown). A detachable splash guard 39, attached to above housing and support 10, is normally employed to close the system to prevent the ingress of contaminants therein.

Figure 2:
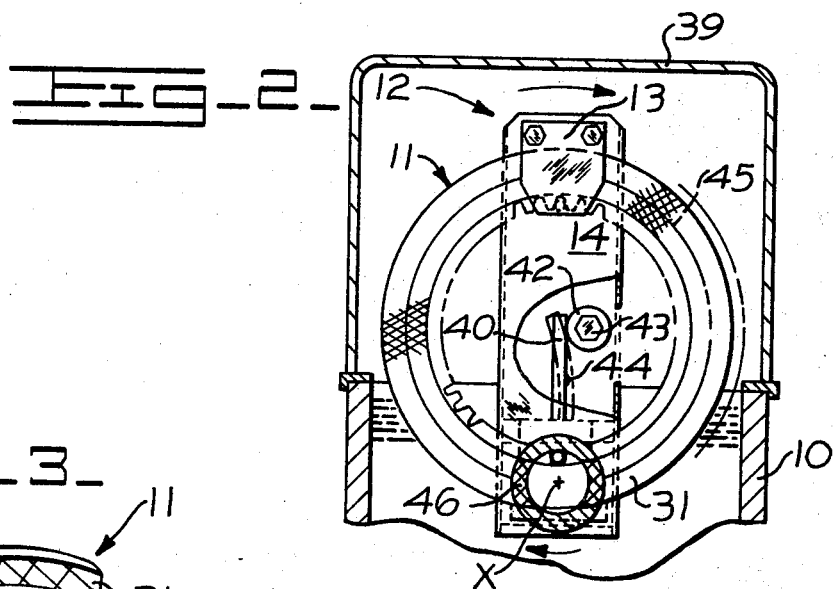
FIG. 2 is a transverse section taken in the direction of arrows II—II in FIG. 1.

In general, the FIG. 1 apparatus is adapted for accurately and expeditiously determining the static and dynamic coefficients of friction of disc surface 31 by equating same to a torque read-out developed in response to a pivoting of disc 11 and attached member 14. In particular, rotation of mandrel surface 30 against the abutting and compressed working surface of the disc will induce pivoting of the disc and member to flex a hereinafter described strain-gaged torque link 40 (FIG. 2). The surfaces abut under a predetermined unit pressure as governed by selectively controlled air-actuated cylinder 20.

As shown in FIG. 2, the test sample and thus member 14 are induced to pivot clockwise about axis X. The torque imparted to the test sample can be equated to the coefficient of friction of tested surface 31 whereas the unit pressure applied thereto and the rotary speed of the mandrel are dictated by predetermined test parameters. The apparatus affords the operator precise control of the resulting unit pressure and sliding velocity to provide accurate data for measuring the torque imparted to the disc. For example, mandrel 28 can rotate at 3,000 rpm and a load of 630 pounds can be simultaneously applied to the test sample. The primary purpose of the cylindrically shaped mandrel is to minimize surface velocity gradient as between the inside and outside diameters thereof.

The torque transmitted by mandrel surface 30 to tested surface 31 is measured by a strain-gaged, flexible torque link 40 of the torque indicator means. The cantilevered link is fixedly attached at one end to a cup-shaped member 41, secured to an end of shaft 18. The link bears against a collar bearing 42 upon pivoting of support 14 (FIG. 2) to bend the reed-type link to its dotted-line position. The collar bearing, rotatably mounted on a bolt 43 secured to frame 10, reduces potential errors which might otherwise arise due to the frictional drag occasioned between the link and the collar bolt.

A standard strain gage 44 is preferably attached to the link at its point of maximum flexure (FIG. 2) to maximize the electrical output signal. The mean diameter 45 of the friction material on disc 11 is preferably intersected by horizontally disposed pivotal axis X and the link is normally arranged in a perpendicularly disposed plane which intersects the pivot axis. A cross-hatched area 46 is schematically illustrated in FIG. 2 to indicate the area of surface contact between the disc and mandrel.

The torque imparted to disc and measured by the strain gage may be received by a standard signal conditioner 47, manufactured by Brush Electronic Co. and identified as Type No. BL–520. The output of the integrated bridge connection (not shown) may be transmitted to an oscillograph 48, also manufactured by such company and identified as Type No. BL–202, to provide visual torque read-out data. Spindle 28 has a toothed spline 49 formed thereon to provide means for magnetically detecting the rotational speed of the spindle by a magnetic pick-up 50. Such speed is then displayed on a second oscillograph 51 via an electronic counter 52 and signal conditioner 53 also of conventional design.

Figure 4:
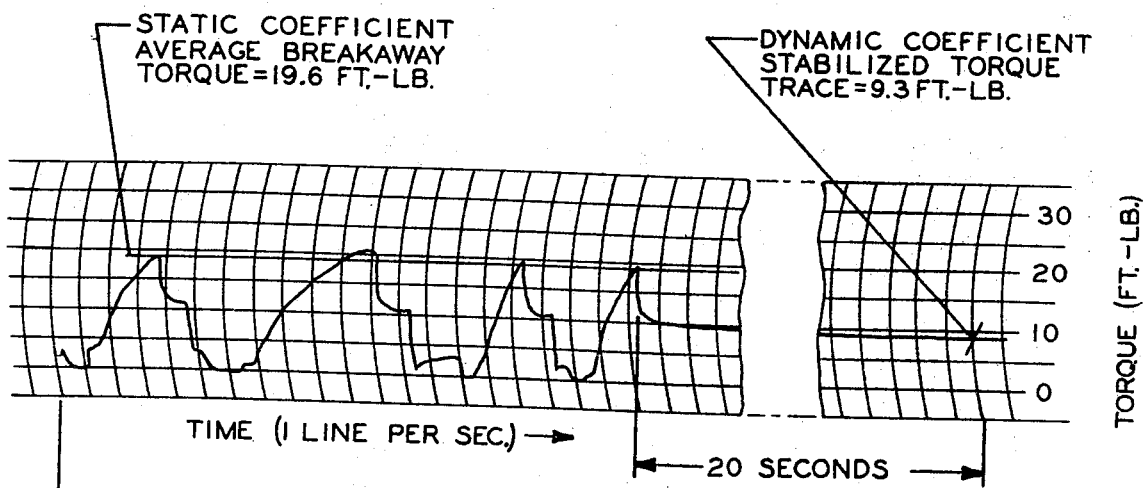
FIG. 4 shows graphical torque traces equatable to the static and dynamic coefficients of friction of a tested sample.
Figure 5:
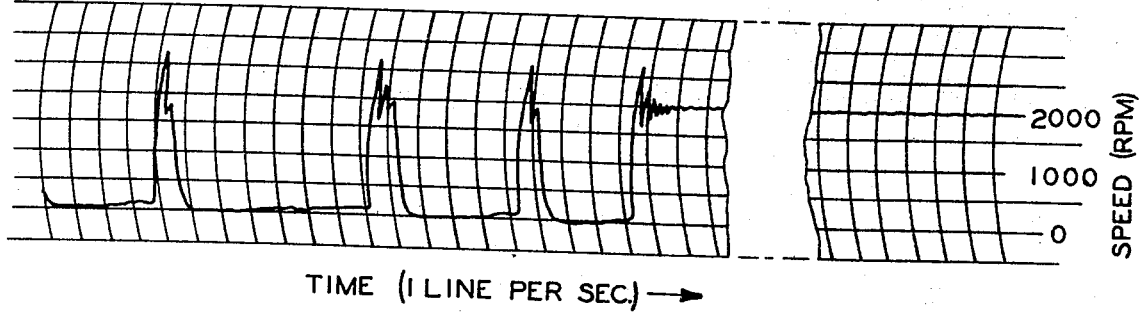
FIG. 5 shows a trace of spindle speeds corresponding to the traces shown in FIG. 4.

FIGS. 4 and 5 graphically illustrate a typical test run wherein the plotted torque and speed traces, obtained from oscillographs 48 and 51, are displayed for use in computing the static and dynamic coefficients of friction of disc surface 31. The general formula used for calculating the coefficients of friction is:

$$\mu = t \times 12/(F_n)(R_m)$$

where: $\mu$ = coefficient of friction
$t$ = the torque applied to link 40 (ft.-lb.)
$F_n$ = the normal force applied to disc 11 by cylinder 20 and shaft 18 (lb.)
$R_m$ = the mean radius of mandrel 24 (in.)

A typical test sequence comprised mounting disc 11 on support member 14 by means of pins 15 and 16 and clamp 13. The mean radius of mandrel 24 was measured at 2.0 in. Control valve 21 was actuated to pressurize the actuating chamber of cylinder 20 at 30 psi to apply an axial load of 626.6 lb. to shaft 18 and thus disc surface 31.

The hand lever of the control system for power supply means 26 was moved gradually until the motor was energized sufficiently to rotate mandrel 24 to "break" the static contact occasioned between compressed surfaces 30 and 31. Upon breakaway, the motor was stopped and the breakaway cycle was repeated several times. The static coefficient of friction was then calculated by averaging the peak torque (19.6 ft.-lb.) developed over several cycles (FIG. 4).

After completion of the breakaway test procedure, the motor was allowed to run constantly at 2,000 rpm. The dynamic and stabilized torque reading at 2,000 rpm (9.3 ft.-lb.) was then taken 20 seconds after breakaway (FIG. 4). When a dynamic coefficient of friction readout is desired at a lower sliding velocity, the motor speed can be reduced to achieve same.

Applying the above formula to the aforementioned test results, wherein the average breakaway torque and stabilized dynamic torque equalled 19.6 ft.-lb. and 9.3 ft.-lb. respectively, the following static ($\mu_s$) and dynamic ($\mu_d$) coefficients of friction were obtained:

$$\mu_s = (19.6)(12)/(626.6)(2) = 0.188$$

$$\mu_d = (9.3)(12)/(626.6)(2) = 0.089$$

What is claimed is:

1. An apparatus for obtaining the coefficient of friction of the surface of a test sample comprising
    fixture means fixedly mounting a test sample thereon, said fixture means mounted for limited pivotal movement about a pivot axis in said apparatus,
    rotating means having a surface positioned adjacent to said fixture means and rotatably engaging a surface of the test sample to induce pivoting of said fixture means about said pivot axis,
    load application means for pressing the surface of said rotating means and the surface of the test sample together under a predetermined force, and
    torque indicator means responsive to pivotal movement of said fixture means for indicating the torque applied to the test sample by said rotating means.

2. The invention of claim 1 wherein said fixture means comprises a vertically disposed member, means for releasably detaching a test sample on said member and a horizontally disposed shaft having said member attached to a first end thereof.

3. The invention of claim 2 wherein said shaft is mounted for axial movement along and rotational movement about said axis and wherein said load application means is operatively connected to a second end of said shaft.

4. The invention of claim 2 wherein said torque indicator means comprises a flexible link attached at one end thereof to said shaft for rotation therewith.

5. The invention of claim 4 wherein said torque indicator means further comprises means fixedly mounted in said apparatus, adjacent to said link, for engaging and bending said link in response to pivoting of said member and strain gage means attached to said link adjacent to its point of maximum flexure.

6. The invention of claim 5 wherein said torque indicator means further comprises means for visually reading-out the torque applied to said link.

7. The invention of claim 1 wherein said rotating means comprises a mandrel having a surface positioned closely adjacent to said fixture means to engage the surface of a test sample.

8. The invention of claim 7 wherein said mandrel is a hollow cylinder.

9. The invention of claim 7 wherein said mandrel is attached to a spindle rotatably mounted in said apparatus and power means for selectively rotating said spindle and said mandrel.

10. The invention of claim 9 further comprising means operatively associated with said mandrel for visually detecting the rotational speed thereof.

11. The invention of claim 1 wherein a test sample, constituting an annular friction disc, is mounted on said fixture means to have a tested surface thereof intersected by said pivot axis.

12. In an apparatus for obtaining the coefficient of friction of the surface of a test sample, the invention comprising means fixedly mounting a test sample on fixture means in said apparatus, said fixture means mounted for limited pivotal movement about a pivot axis, means for rotating the surface of a mandrel against only a portion of the surface of said test sample to pivot said fixture means and test sample about said pivot axis, means for pressing said surfaces together under a predetermined load and means for measuring the torque applied to said test sample in response to pivoting of said fixture means and test sample.

* * * * *